United States Patent
Noda

(10) Patent No.: US 6,852,763 B2
(45) Date of Patent: Feb. 8, 2005

(54) POLYURETHANE FOAM COMPOUND FOR INK HOLDER, INK HOLDER, AND METHOD FOR ENSURING CLOSE CONTACT FOR INK HOLDER

(75) Inventor: Yosuke Noda, Yokohama (JP)

(73) Assignee: Bridgestone Corporation, Tokyo (JP)

(*) Notice: Subject to any disclaimer, the term of this patent is extended or adjusted under 35 U.S.C. 154(b) by 0 days.

(21) Appl. No.: 10/398,922

(22) PCT Filed: Jun. 19, 2001

(86) PCT No.: PCT/JP01/05217

§ 371 (c)(1),
(2), (4) Date: Apr. 11, 2003

(87) PCT Pub. No.: WO02/32675

PCT Pub. Date: Apr. 25, 2002

(65) Prior Publication Data

US 2004/0044092 A1 Mar. 4, 2004

(30) Foreign Application Priority Data

Oct. 13, 2000 (JP) .................................... 2000-313680

(51) Int. Cl.⁷ .............................................. C08L 75/04
(52) U.S. Cl. .......................... 521/137; 347/86; 347/87; 521/134; 521/159; 521/170; 521/174
(58) Field of Search ................................ 521/134, 137, 521/159, 170, 174; 347/86, 87

(56) References Cited

U.S. PATENT DOCUMENTS 4,771,295 A * 9/1988 Baker et al. .................. 347/87
4,904,706 A * 2/1990 Uenishi et al. ............. 521/164
6,168,253 B1   1/2001 Miyagawa et al.
6,371,606 B1 * 4/2002 Free ............................ 347/86
6,596,785 B2 * 7/2003 Free ............................ 521/174

FOREIGN PATENT DOCUMENTS

| JP | 9-111173 A | 4/1997 |
| JP | 9-234869 A | 9/1997 |
| JP | 9-249728 A | 9/1997 |
| JP | 10-25328 A | 1/1998 |
| JP | 10-100307 A | 4/1998 |
| JP | 10-168154 A | 6/1998 |
| JP | 10-195162 A | 7/1998 |
| JP | 11-147927 A | 6/1999 |
| JP | 11-198399 A | 7/1999 |
| JP | 2001-98043 A | 4/2001 |
| JP | 2001-105622 A | 4/2001 |

* cited by examiner

Primary Examiner—John M. Cooney, Jr.
(74) Attorney, Agent, or Firm—Sughrue Mion, PLLC

(57) ABSTRACT

A polyurethane foam compound for an ink holder, characterized in that it comprises a polyol and an isocyanate as main components, and also a crosslinking agent; an ink holder, characterized in that it is prepared by foaming, curing and crosslinking the compound; a method for securing the close contact of an ink holder, which comprises using the above described ink holder, and placing the ink holder in an ink tank for containing an ink in a manner such that the ink holder is attached to the inner wall of the ink tank.

18 Claims, No Drawings

POLYURETHANE FOAM COMPOUND FOR INK HOLDER, INK HOLDER, AND METHOD FOR ENSURING CLOSE CONTACT FOR INK HOLDER

TECHNICAL FIELD

The present invention relates to a polyurethane foam compound for an ink holder used to supply ink to the print head, an ink holder which is obtained by foaming, curing, and cross-linking from the compound, and a method for ensuring close contact for the ink holder. More particularly, the present invention relates to a polyurethane foam compound to yield an ink holder which has very little residual compressive strain and easily follows the deformation of the ink tank and keeps close contact with the inside of the ink tank for a long period of time; an ink holder; and a method for making the ink holder to remain in close contact with the inside of the ink tank for a long period of time.

BACKGROUND ART

The recent advance in OA equipment is remarkable. In the field of printers, the wire dot system and thermal transfer system are being replaced by the ink jet system.

Printers of the ink jet system usually have an ink holder in the ink tank (or ink storing container) for stable ink holding. Highly improved printers require the ink holder to have not only good ink holding performance but also have many other capabilities. For example, the ink holder tends to dissolve in ink and the dissolved matter lowers the surface tension of ink, thereby causing defective printing. In order to address this problem, there has been proposed a new ink holder capable of stably supplying ink without denaturing ink, which is formed from a polyurethane foam of special polyol.

Even such an ink holder, however, is still liable to deterioration by ink in the ink tank. In addition, when the ink tank temporarily deforms and returns to its original shape, the ink holder does not follow such deformation due to plastic deformation, with the result that a shortcut for air occurs between the ink holder and the inside of the ink tank. The ink holder also undergoes plastic deformation when it is attached to the ink tank, it is vacuum-packed and unpacked, and it is piled up during storage for a long period of time, or when the ink tank is dropped. As mentioned above, once a shortcut occurs, air enters it to prevent smooth ink supply, thereby causing defective printing. This air entrapment readily causes defective printing in the case of modern highly sophisticated ink jet printers.

The present invention was completed in view of the foregoing. It is an object of the present invention to provide a polyurethane foam compound for ink holders, an ink holder which is obtained from the polyurethane foam compound by foaming, curing, and cross-linking, and a method for permitting the ink holder to remain in close contact with the inside of the ink tank for a long period of time. The ink holder mentioned above has an extremely low level of residual compressive strain and readily follows the deformation of the ink tank.

In order to achieve the above-mentioned object, the present inventors carried out a series of researches which led to the following finding. The polyurethane foam for ink holders, which is obtained from a polyurethane foam compound composed mainly of polyol and isocyanate, has very little residual compressive strain and readily follows the deformation of the ink tank while it is immersed in ink (an aqueous solution of hydrophilic organic solvent), if the polyurethane foam compound is incorporated with a cross-linking agent as an essential component.

The present inventors also found the following. The extreme reduction in residual compressive strain permits the polyurethane foam to retain stress over a long period of time. Consequently, the polyurethane foam as the ink holder remains in close contact with the inside of the ink tank for a long period of time after it has been placed in the ink tank. In addition, the ink holder keeps in close contact with the inside of the ink tank even when the ink tank is deformed by external pressure. This contributes to good printing performance over a long period of time.

The present inventors also found that the polyurethane foam obtained by foaming, curing, and cross-linking the above-mentioned polyurethane foam compound is suitable for use as the ink holder in modern highly sophisticated ink jet printers.

The present inventors also found the following. The ink holder, which is hardly affected by ink, remains in close contact with the inside of the ink tank over a long period of time, if it is formed from a polyurethane foam compound containing a cross-linking agent as an essential component as mentioned above. The present invention was completed on the basis of the above-mentioned findings.

Accordingly, the present invention is directed to a polyurethane foam compound for ink holders, an ink holder, and a method for permitting the ink holder to keep close contact.

(1) A polyurethane foam compound for ink holders which is characterized in being composed mainly of polyol and isocyanate and incorporated with a cross-linking agent.

(2) The polyurethane foam compound for ink holders as defined in (1) above, in which the cross-linking agent is a hydroxyl group-containing compound having an average molecular weight of 50 to 500 and 2 to 10 functional groups.

(3) The polyurethane foam compound ink holders as defined in (1) or (2) above, in which the cross-linking agent is one which has an OH value no less than 100.

(4) The polyurethane foam compound for ink holders as defined in any of (1) to (3) above, in which the cross-linking agent is added in an amount of 0.1 to 10 parts by weight for 100 parts by weight of polyol.

(5) The polyurethane foam for ink holders as defined in any one of (1) to (4) above, in which the polyol is at least one species selected from the group consisting of polyether polyol and polymer polyol grafted with styrene and/or acrylonitrile.

(6) An ink holder which is characterized in being obtained by foaming, curing, and cross-linking the polyurethane foam compound defined in any one of (1) to (5) above.

(7) The ink holder as defined in (6) above, which has a residual compressive strain equal to 10% or less which is measured in its released state after immersion under compression by 30% in an aqueous solution of hydrophilic organic solvent at 60° C. for 72 hours.

(8) The ink holder as defined in (6) or (7) above, which is intended for use in ink jet printers.

(9) A method for permitting an ink holder, which has been placed in an ink tank, to keep close contact with the inside of the ink tank, the method being characterized in that the ink holder is the one which is mentioned in any of (6) to (8) above.

BEST MODE FOR CARRYING OUT THE INVENTION

According to the present invention, the polyurethane foam compound for ink holders is composed mainly of polyol and isocyanate, as with the ordinary polyurethane foam compound for ink holders.

The polyol should be one which has a number-average molecular weight of 1000 to 10000, preferably 2000 to 5000. In addition, it should be one which has an OH value of 20 to 100, preferably 30 to 60. Preferred examples of such polyols include polyether polyols, polyester polyols, polyester-polyether polyols, and modified polyols thereof such as polymer polyols grafted with styrene and/or acrylonitrile, with the first and last being preferable. They may be used alone or in combination with one another. In the case of combined use, individual polyols should be compounded in a ratio of 1:1 by weight.

The above-mentioned polyols are commercially available as follow. "E-3030" polyether polyol, with a molecular weight of 3000, f=3, from Asahi Glass Co., Ltd., "V3943A" copolymer polyol grafted with 43% acrylonitrile and styrene, with a molecular weight of 3000 for base polyol, f=3, from Dow Polyurethane Japan, Ltd., "3P56B" polyester-polyether polyol, with a molecular weight of 3000, f=3, from Takeda Chemical Industries, Ltd.

The isocyanate may be any known one exemplified by tolylene diisocyanate, diphenylmethane diisocyanate, tripheny diisocyanate, xylene diisocyanate, polymethylene polyphenylene polyisocyanate, hexamethylene diisocyanate, and isophorone diisocyanate.

The above-mentioned isocyanate may be used in any amount which is not specifically restricted. However, its amount is usually 20 to 100 parts by weight, particularly 30 to 60 parts by weight, for 100 parts by weight of all polyols. With an amount more than 100 parts by weight, the isocyanate excessively promotes the resin-forming reaction, thereby giving rise to a closed-cell foam. With an amount less than 20 parts by weight, the isocyanate does not promote the resin-forming reaction.

The polyurethane foam compound for ink holders is the one which is composed mainly of polyol and isocyanate as mentioned above. However, according to the present invention, it is incorporated with a cross-linking agent as an essential component.

The cross-linking agent used in the present invention should be a hydroxyl group-containing compound which has an average molecular weight of 50 to 500, particularly 100 to 200, and also has 2 to 10, particularly 2 to 4, functional groups.

According to the present invention, the cross-linking agent should have an OH value equal to 100 or more, preferably from 200 to 1500. With an OH value of less than 100, the cross-linking agent does not contribute to the reduction of residual compressive strain.

Typical examples of the cross-linking agent include trimethylolpropane, diethylene glycol, sugar, pentaerythritol, 1,4-butanediol, dipropylene glycol, ethylenediamine, and glycerin, and their adducts with propylene oxide or ethylene oxide or the like. They are commercially available as follows. "T-880" and "GR-04" from Takeda Chemical Industries, Ltd., "QX82211" from Dow Polyurethane Japan, Ltd.

The amount of the cross-linking agent is usually 0.1 to 10 parts by weight, particularly 1 to 5 parts by weight, for 100 parts by weight of all polyols, depending on the components incorporated. With an amount exceeds 10 parts by weight, the cross-linking agent gives a polyurethane foam of closed-cell structure which cannot be made into the ink holder. With an amount less than 0.1 parts by weight, the cross-linking agent gives rise to a polyurethane foam which has no appreciable residual compressive strain after immersion in an aqueous solution of a hydrophilic organic solvent.

According to the present invention, the polyurethane foam compound for ink holders may be optionally incorporated with blowing agents, catalysts, and foam stabilizers, as with ordinary ones.

The blowing agents may be incorporated into the compound as the occasion may demand. Water is a preferred blowing agent, and methylene chloride and monofluorotrichloro-methane may also be used as blowing agents. The amount of the blowing agent may be usually 0 to 15 parts by weight, particularly 0 to 5 parts by weight, for 100 parts by weight of all polyols.

The catalysts include both amine-based ones and tin-based ones. Examples of the amine-based catalysts include tetramethylhexamethylenediamine, pentamethyldiethylenetriamine, dimethylcyclohexylamine, bis-(dimethylaminoethyl)-ether, tetramethylpropylenediamine, trimethylaminoethyl-piperazine, tetramethylethylenediamine, dimethylbenzylamine, methylmorpholine, ethylmorpholine, triethylenediamine, etc. Examples of the tin-based catalysts include stannous octoate, dibutyltin dilaurate, etc. The amount of the catalysts is usually 0 to 5 parts by weight, particularly 0.1 to 1 part by weight, for 100 parts by weight of all polyols.

The foam stabilizers include, for example, organopolysiloxane, alkyl carboxylate, alkylbenzenesulfonate, etc. The amount of the foam stabilizer is usually 0 to 5 parts by weight, particularly 0.5 to 2 parts by weight, for 100 parts by weight of all polyols.

The hydrophilic organic solvent includes, for example, monohydric alcohols such as methanol, ethanol, isopropyl alcohol, and propyl alcohol, polyhydric alcohols such as glycerin and ethylene glycol, polymers of polyhydric alcohol such as diethylene glycol and triethylene glycol, and polymers of monohydric alcohol and polyhydric alcohol such as diethylene glycol monobutyl ether and triethylene glycol monobutyl ether.

The polyurethane foam compound according to the present invention may be incorporated with additional components, which include fillers such as calcium carbonate, antioxidant, UV light absorber, and flame retardant.

The ink holder of the present invention is obtained from the above-mentioned polyurethane foam compound for ink holders by foaming, curing, and cross-linking in any known method, such as one-shot process and prepolymer process. Incidentally, the foaming temperature is 0 to 40° C., particularly 15 to 25° C. Foaming may be accomplished with or without compression, and the compression ratio is usually from 1/1 to 1/5, although not specifically restricted.

In addition, according to the present invention, the thus obtained polyurethane foam for use as ink holders is of three-dimensional reticulate skeleton type, with foam cell membrane removed. Removal of foam cell membrane may be accomplished by immersion in an alkaline aqueous solution or explosion by hydrogen gas and oxygen gas introduced into the foam, with the latter method being preferable.

The thus produced ink holder should preferably be the one which has a controlled cell number, which is usually 30 to 100 cells per inch, preferably 40 to 60 cells per inch. With an excessively large cell number, the polyurethane foam prevents ink from being poured and discharged easily. With an excessively small cell number, the polyurethane foam is poor in ink retaining power, which leads to ink leakage.

According to the present invention, the ink holder is formed from the above-mentioned compound. However, it should meet the requirement that it should have a residual compressive strain equal to 10% or less, particularly equal to 5% or less, which is measured in its released state after immersion under compression by 30% in an aqueous solution of hydrophilic organic solvent at 60° C. for 72 hours. With a residual compressive strain exceeds 10%, the polyurethane foam does not retain sufficient stress and hence does not keep close contact with the inside of the ink tank over a long period of time. The loose contact forms a shortcut for air to enter, thereby causing defective printing. Incidentally, the above-mentioned aqueous solution should preferably be that of methanol, diethylene glycol, or glycerin, etc.

The ink holder obtained as mentioned above will be used for various ink jet printers and laser printers. It is particularly suitable for ink jet printers. Being free from deterioration by ink, it ensures good printing performance for a long period of time.

According to the present invention, the ink holder, which has been produced by foaming, curing, and cross-linking from the polyurethane foam compound containing a cross-linking agent as an essential component as mentioned above, is placed in an ink tank by known method. Thus, the ink holder remains in close contact with the inside of the ink tank.

This procedure is accomplished by any known method. For example, the ink holder is produced in a shape conforming to the ink tank and subsequently it is placed in the ink tank. Finally, the ink tank is filled with ink and closed after evacuation. In this way it is possible to attach the ink holder in close contact with the inside of the ink tank without the necessity for any special step.

The ink holder thus placed in the ink tank by the above-mentioned method according to the present invention follows the deformation of the ink tank, thereby keeping close contact with the inside of the ink tank over a long period of time. This close contact eliminates shortcuts for air to pass through which would otherwise form between the ink holder and the inside of the ink tank. The above-mentioned method of the present invention may be applied to a variety of ink tanks mounted in highly sophisticated ink jet printers. Thus the ink holder mentioned above extends the life of ink tanks.

EXAMPLE

The present invention will be described in more detail with reference to the following Examples and Comparative Examples, which are not intended to restrict the scope thereof.

Examples and Comparative Examples

Polyurethane foam compounds were prepared according to the formations shown in Tables 1 to 4. Each compound was made into a block of flexible polyurethane foam, measuring 250 mm high, 300 mm wide, and 300 mm long, by foaming, curing, and cross-linking at 25° C. The resulting polyurethane foam had cell membrane removed by explosion process. The resulting reticulate polyurethane foam under compression by 30% was immersed in an aqueous solution of hydrophilic organic solvent at 60° C. for 72 hours. After immersion, the sample was relieved from compression and examined for residual compressive strain.

Ink holders of polyurethane foam in identical shape were prepared from the polyurethane foam compounds shown in Tables 1 to 4 by foaming, curing, and cross-linking at 25° C.

Each of the resulting ink holders was placed in an ink tank. The ink tank was subsequently filled with ink and tightly closed after evacuation. The filled ink tank was heated at 60° C. for 72 hours.

The heat-treated ink tank was mounted on a commercial ink jet printer and evaluated for printing performance. The printing performance was rated according to the following criteria. The results are shown in Tables 1 to 4.

○: very good

X: poor (partly unclear print)

The components in the formulations shown in Tables 1 to 4 are as follows. Measurements were carried out under the following conditions.

Components in formulation

Polyol 1: "E-3030" polyether polyol, from Asahi Glass Co., Ltd.

Polyol 2: "V3943A" copolymer polyol grafted with acrylonitrile and styrene, from Dow Polyurethane Japan, Ltd.

Isocyanate: "TDI-80" polyisocyanate, from Nippon Polyurethane Industry Co., Ltd.

Cross-linking agent 1: "T-880" having an OH value of 880, from Takeda Chemical Industries, Ltd.

Cross-linking agent 2: "XQ82211" having an OH value of 1300, from Dow Polyurethane Japan, Ltd.

Cross-linking agent 3: "GR-04" having an OH value of 400, from Takeda Chemical Industries, Ltd.

Silicone foam stabilizer: "L-6202B" from Nippon Unicar Co., Ltd.

Tin catalyst: "Stanocto" from Takeda Chemical Industries, Ltd.

Aqueous solution of hydrophilic organic solvent

A: 10% solution of methanol

B: 10% solution of diethylene glycol

C: 10% solution of glycerin

TABLE 1

| Components | Example No. | | | | | | | | |
| --- | --- | --- | --- | --- | --- | --- | --- | --- | --- |
| | 1 | 2 | 3 | 4 | 5 | 6 | 7 | 8 | 9 |
| Polyol 1 | 0 | 0 | 0 | 50 | 50 | 50 | 100 | 100 | 100 |
| Polyol 2 | 100 | 100 | 100 | 50 | 50 | 50 | 0 | 0 | 0 |
| Cross-linking agent 1 | 1.5 | 1.5 | 1.5 | 1.5 | 1.5 | 1.5 | 1.5 | 1.5 | 1.5 |
| Cross-linking agent 2 | — | — | — | — | — | — | — | — | — |
| Isocyanate | 24.5 | 24.5 | 24.5 | 26.6 | 26.6 | 26.6 | 28.7 | 28.7 | 28.7 |
| Purified water | 1.5 | 1.5 | 1.5 | 1.5 | 1.5 | 1.5 | 1.5 | 1.5 | 1.5 |
| Amine catalyst | 0.3 | 0.3 | 0.3 | 0.3 | 0.3 | 0.3 | 0.3 | 0.3 | 0.3 |
| Silicone foam stabilizer | 1 | 1 | 1 | 1 | 1 | 1 | 1 | 1 | 1 |
| Tin catalyst | 0.2 | 0.2 | 0.2 | 0.2 | 0.2 | 0.2 | 0.2 | 0.2 | 0.2 |

TABLE 1-continued

|  | Example No. | | | | | | | | |
| --- | --- | --- | --- | --- | --- | --- | --- | --- | --- |
| Components | 1 | 2 | 3 | 4 | 5 | 6 | 7 | 8 | 9 |
| 30% Residual strain (%) in aqueous solution of hydrophilic organic solvent | 2.2 | 2.5 | 3.1 | 1.3 | 2.6 | 1.9 | 0.5 | 1.7 | 2.9 |
| Aqueous solution | A | B | C | A | B | C | A | B | C |
| Printing performance | ○ | ○ | ○ | ○ | ○ | ○ | ○ | ○ | ○ |

TABLE 2

|  | Example No. | | | | | | | | |
| --- | --- | --- | --- | --- | --- | --- | --- | --- | --- |
| Components | 10 | 11 | 12 | 13 | 14 | 15 | 16 | 17 | 18 |
| Polyol 1 | 0 | 0 | 0 | 50 | 50 | 50 | 100 | 100 | 100 |
| Polyol 2 | 100 | 100 | 100 | 50 | 50 | 50 | 0 | 0 | 0 |
| Cross-linking agent 1 | — | — | — | — | — | — | — | — | — |
| Cross-linking agent 2 | 1.5 | 1.5 | 1.5 | 1.5 | 1.5 | 1.5 | 1.5 | 1.5 | 1.5 |
| Isocyanate | 25.3 | 25.3 | 25.3 | 27.4 | 27.4 | 27.4 | 29.5 | 29.5 | 29.5 |
| Purified water | 1.5 | 1.5 | 1.5 | 1.5 | 1.5 | 1.5 | 1.5 | 1.5 | 1.5 |
| Amine catalyst | 0.3 | 0.3 | 0.3 | 0.3 | 0.3 | 0.3 | 0.3 | 0.3 | 0.3 |
| Silicone foam stabilizer | 1 | 1 | 1 | 1 | 1 | 1 | 1 | 1 | 1 |
| Tin catalyst | 0.2 | 0.2 | 0.2 | 0.2 | 0.2 | 0.2 | 0.2 | 0.2 | 0.2 |
| 30% Residual strain (%) in aqueous solution of hydrophilic organic solvent | 3.6 | 4.5 | 3.8 | 2.7 | 3.8 | 3.7 | 1.9 | 3.4 | 2.5 |
| Aqueous solution | A | B | C | A | B | C | A | B | C |
| Printing performance | ○ | ○ | ○ | ○ | ○ | ○ | ○ | ○ | ○ |

TABLE 3

|  | Comparative Example No. | | | | | | | | |
| --- | --- | --- | --- | --- | --- | --- | --- | --- | --- |
| Components | 1 | 2 | 3 | 4 | 5 | 6 | 7 | 8 | 9 |
| Polyol 1 | 0 | 0 | 0 | 50 | 50 | 50 | 100 | 100 | 100 |
| Polyol 2 | 100 | 100 | 100 | 50 | 50 | 50 | 0 | 0 | 0 |
| Cross-linking agent 1 | — | — | — | — | — | — | — | — | — |
| Cross-linking agent 2 | — | — | — | — | — | — | — | — | — |
| Isocyanate | 22.1 | 22.1 | 22.1 | 24.2 | 24.2 | 24.2 | 26.4 | 26.4 | 26.4 |
| Purified water | 1.5 | 1.5 | 1.5 | 1.5 | 1.5 | 1.5 | 1.5 | 1.5 | 1.5 |
| Amine catalyst | 0.3 | 0.3 | 0.3 | 0.3 | 0.3 | 0.3 | 0.3 | 0.3 | 0.3 |
| Silicone foam stabilizer | 1 | 1 | 1 | 1 | 1 | 1 | 1 | 1 | 1 |
| Tin catalyst | 0.2 | 0.2 | 0.2 | 0.2 | 0.2 | 0.2 | 0.2 | 0.2 | 0.2 |
| 30% Residual strain (%) in aqueous solution of hydrophilic organic solvent | 25.4 | 26.3 | 29.6 | 23.5 | 22.1 | 25.6 | 21.9 | 23.8 | 24.4 |
| Aqueous solution | A | B | C | A | B | C | A | B | C |
| Printing performance | X | X | X | X | X | X | X | X | X |

TABLE 4

|  | Example No. | | |
| --- | --- | --- | --- |
| Components | 19 | 20 | 21 |
| Polyol 1 | 100 | 100 | 100 |
| Cross-linking agent 3 | 1.5 | 1.5 | 1.5 |
| Isocyanate | 26.4 | 26.4 | 26.4 |
| Purified water | 1.5 | 1.5 | 1.5 |
| Amine catalyst | 0.3 | 0.3 | 0.3 |
| Silicone foam stabilizer | 1 | 1 | 1 |
| Tin catalyst | 0.2 | 0.2 | 0.2 |
| 30% Residual strain (%) in aqueous solution of hydrophilic organic solvent | 3.6 | 2.9 | 2.8 |
| Aqueous solution | A | B | C |
| Printing performance | ○ | ○ | ○ |

The ink holder obtained from the above-mentioned polyurethane foam compound for ink holders has very little residual compressive strain and hence keeps close contact with the ink tank for a long period of time. This permits good printing performance for a long period of time.

What is claimed is:

1. An ink holder which is characterized in being formed from a polyurethane foam being that of three-dimensional reticulate skeleton type, with foam cell membrane removed, which is obtained by foaming, curing, and cross-linking a polyurethane foam compound which is composed mainly of polyol and isocyanate and is incorporated with a cross-linking agent, wherein said ink holder has a residual compressive strain equal to 10% or less which is measured in its released state after immersion under compression by 30% in an aqueous solution of hydrophilic organic solvent at 60 for 72 hours.

2. The ink holder as defined in claim 1, in which the cross-linking agent is a hydroxyl group-containing compound having an average molecular weight of 50 to 500 and 2 to 10 functional groups.

3. The ink holder as defined in claim 1, in which the cross-linking agent is one which has an OH value equal to 100 or more.

4. The ink holder as defined in claim 1, in which the cross-linking agent is added in an amount of 0.1 to 10 parts by weight for 100 parts by weight of polyol.

5. The ink holder as defined in claim 1, in which the polyol is at least one species selected from the group consisting of polyether polyol and polymer polyol grafted with styrene and/or acrylonitrile.

6. The ink holder as defined in claim 1, which is intended for use in ink jet printers.

7. The ink holder of claim 1, wherein the cell number is 30 to 100 cells per inch.

8. The ink holder of claim 1, wherein the polyurethane foam has a cell number of 40 to 60 cells per inch.

9. The ink holder of claim 1, wherein the polyurethane foam has a residual compressive strain is equal to 5% or less.

10. The ink holder of claim 1, wherein both polyether polyol and polymer polyol grafted with styrene and/or acrylonitrile are used as the polyol.

11. The ink holder of claim 10, wherein the polyether polyol and the polymer polyol grafted with styrene and/or acrylonitrile are compounded in a ratio of 1:1 by weight.

12. The ink holder of claim 1, wherein the amount of the isocyanate is 20 to 29.5 parts by weight for 100 by weight of all polyols.

13. The ink holder of claim 1, wherein the cross-linking agent has an average molecular weight of 100 to 200 and has 2 to 4 functional groups.

14. The ink holder of claim 1, wherein the cross-linking agent has an OH value from 200 to 1500.

15. The ink holder of claim 1, wherein a catalyst is used in an amount of 0.1 to 1 part by weight for 100 parts by weight of all polyols.

16. The ink holder of claim 1, wherein both a amine-based catalyst an tin-based catalyst are used to produce the polyurethane foam.

17. The ink holder of claim 1, wherein the foam cell membrane is removed by an explosion by hydrogen gas and oxygen gas introduced into the foam.

18. The ink holder of claim 1, wherein the aqueous solution of hydrophilic organic solvent is a solution selected from the group consisting of methanol, diethylene glycol and glycerin.

* * * * *